A. J. LEGRAND.
BOILER.
No. 93,725. Patented Aug. 17, 1869.
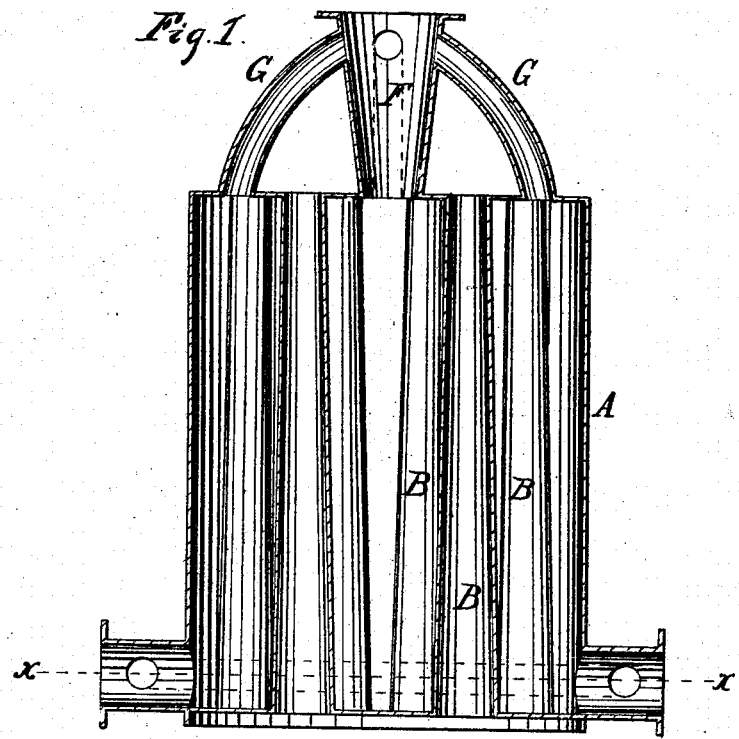
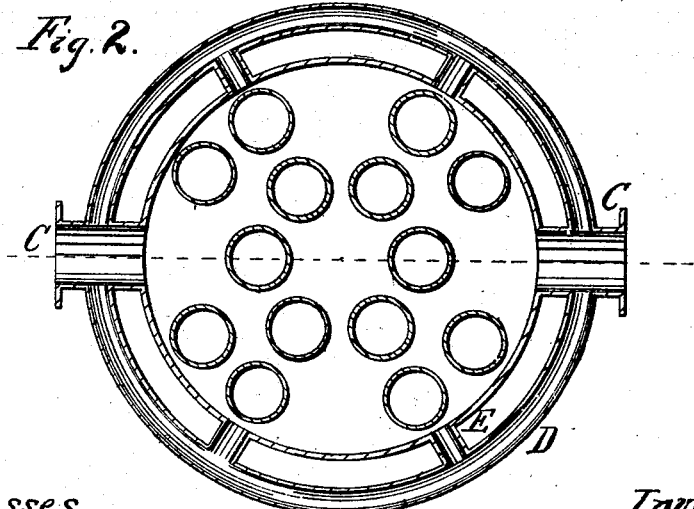

United States Patent Office.

ALFRED JOHN LE GRAND, OF BOONTON, NEW JERSEY.

Letters Patent No. 93,725, dated August 17, 1869.

IMPROVEMENT IN BOILERS.

The Schedule referred to in these Letters Patent and making part of the same.

*To all whom it may concern:*

Be it known that I, ALFRED JOHN LE GRAND, of Boonton, in the county of Morris, and State of New Jersey, have invented a new and useful Improvement in Boilers; and I do hereby declare that the following is a full, clear, and exact description thereof, which will enable others skilled in the art to make and use the same, reference being had to the accompanying drawings, forming part of this specification.

This invention relates to improvements in boilers such as are used in houses for supplying hot water, or for generating steam for heating buildings, or for heating by hot water, as in horticultural buildings, but applicable also to boilers used for generating steam for obtaining power.

The invention consists in the arrangement of heating, supply, and delivery-tubes, all as hereinafter specified.

Figure 1 represents a sectional elevation of my improved boiler, and

Figure 2 represents a transverse section of the same, taken on the line $x\ x$ of fig. 1.

Similar letters of reference indicate corresponding parts.

A represents a cylindrical shell, having tubes B arranged to pass through it, from end to end, and made larger at the bottom than at the top, which I consider has a better effect in imparting the heat which passes up along the tubes to the water within.

C represents main-supply or return-tubes, opening into the sides of the cylinder A, near the bottom. To these I connect a circular tube, D, encircling the cylinder at some distance from it, and connected to it by four, more or less, supporting-tubes, E, through which the water also flows.

F represents the main hot-water or steam-pipe, to which curved branch-pipes G, leading from the top of the cylinder, are connected, a short distance above the top.

I propose to construct small boilers, for horticultural and other buildings, of the above-described arrangement, by casting them all in one piece, whereby they may be cheaply made; and, in setting them up for use, I propose to arrange them in a brick arch or fire-place, in such a way that the heat will not only pass freely through the tubes B, but also around the exterior surface of the cylinder A, and the pipes C D and F G, thus affording a very great amount of fire-surface, whereby very much smaller and less expensive boilers may serve to supply a sufficient amount of heat, than by the common arrangement.

Having thus described my invention,

I claim as new, and desire to secure by Letters Patent—

The cylinder A, vertical tubes B, return-tubes C D E, and hot-water tubes F G, all combined and arranged substantially as specified.

ALFRED JOHN LE GRAND.

Witnesses:
ALEXANDER HALLEY,
ELI WORMAN.